US011315060B2

(12) United States Patent
Agarwal et al.

(10) Patent No.: US 11,315,060 B2
(45) Date of Patent: Apr. 26, 2022

(54) SYSTEM AND METHOD FOR VISUALIZING WORKFLOWS IN AN ENTIRE MANAGEMENT ECOSYSTEM

(71) Applicant: Walmart Apollo, LLC, Bentonville, AR (US)

(72) Inventors: Vaibhav Agarwal, Centerton, AR (US); Arul Kumaran Rathinasabapathy, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/582,482

(22) Filed: Sep. 25, 2019

(65) Prior Publication Data
US 2020/0097880 A1    Mar. 26, 2020

Related U.S. Application Data

(60) Provisional application No. 62/736,856, filed on Sep. 26, 2018.

(51) Int. Cl.
*G06Q 10/06* (2012.01)
*G06F 9/451* (2018.01)

(52) U.S. Cl.
CPC ....... *G06Q 10/06393* (2013.01); *G06F 9/451* (2018.02); *G06Q 10/0633* (2013.01)

(58) Field of Classification Search
CPC .......... G06Q 10/06393; G06Q 10/0633; G06F 9/451
See application file for complete search history.

(56) References Cited

U.S. PATENT DOCUMENTS

| | | |
|---|---|---|
| 7,610,549 B2 | 10/2009 | Vignet |
| 7,979,297 B1 | 7/2011 | Shivananda et al. |
| 8,131,562 B2 | 3/2012 | Hernandez et al. |
| 9,442,475 B2 | 9/2016 | Subramanian et al. |
| 9,594,478 B2 | 3/2017 | Grieve et al. |
| 10,048,985 B2 | 8/2018 | Alvarez Cavazos et al. |
| 2003/0233387 A1 | 12/2003 | Watanabe et al. |
| 2005/0097536 A1 | 5/2005 | Bernstein et al. |

(Continued)

OTHER PUBLICATIONS

Servicenow, SLA timeline, Jul. 26, 2018, https://docs.servicenow.com/bundle/quebec-it-service-management/page/product/service-level-management/concept/c_SLATimeline.html, pp. 1-5 (Year: 2018).*

*Primary Examiner* — Daniel W Parcher
(74) *Attorney, Agent, or Firm* — Duane Morris LLP; Manita Rawat

(57) ABSTRACT

The present invention is directed to a system and method for visualizing workflows in an entire management ecosystem. A computer-implemented method of visualizing live workflows may include: aggregating, by a processor from a database, Key Performance Indicator (KPI) datasets associated with a plurality of teams, each team comprising a plurality of jobs and each job comprising a KPI dataset; obtaining a predefined service Level Agreement (SLA) value associated with each team for measuring each team workflow; and displaying, on a dashboard, the predefined SLA value and the KPI datasets associated with the plurality of teams, wherein each team workflow is visualized as a sequence of bars along a column representing a time axis in real time.

16 Claims, 11 Drawing Sheets

(56) References Cited

U.S. PATENT DOCUMENTS

| | | | |
|---|---|---|---|
| 2006/0288251 A1* | 12/2006 | Jackson | G06F 11/1471 714/19 |
| 2007/0150327 A1* | 6/2007 | Dromgold | G06F 16/2477 705/7.17 |
| 2008/0312979 A1* | 12/2008 | Lee | G06Q 10/06375 705/7.28 |
| 2009/0018847 A1* | 1/2009 | Vanbeck | G06Q 10/0639 705/348 |
| 2012/0102007 A1* | 4/2012 | Ramasubramanian | G06F 16/254 707/705 |
| 2016/0063192 A1* | 3/2016 | Johnson | G06Q 10/0635 705/2 |
| 2018/0324056 A1* | 11/2018 | Occhialini | G06F 3/04817 |
| 2018/0329372 A1* | 11/2018 | Nixon | G05B 13/026 |

\* cited by examiner

SYSTEM AND METHOD FOR VISUALIZING WORKFLOWS IN AN ENTIRE MANAGEMENT ECOSYSTEM

PRIORITY

The present application claims priority to U.S. provisional patent application number 62/736,856, filed Sep. 26, 2018, the contents of which are incorporated herein in their entirety.

BACKGROUND

1. Technical Field

The present disclosure relates to workflow management, and more specifically to systems and methods for visualizing workflows in an entire management ecosystem.

2. Introduction

Retail store management generally involves in multiple workflows or jobs conducted by different teams cooperatively and simultaneously. A team is normally assigned multiple jobs where each job has defined requirements or instructions for the team to perform. A team workflow is represented as a combination of performances of sequential jobs. For example, a retail store may handle over 100 workflows which are associated with 600 to 700 jobs every day. In some cases, there may be more than 2000 jobs associated with hundreds of workflows. It is very hard for developers to monitor and measure such a great amount of workflows and jobs. Additionally, most decision makers may not be sure how their workflows behave at a detailed level.

The number of jobs has been constantly increasing in a retailer's e-commence system. Some workflow management tools or software may automate task managements in business operations. However, there is a need to help the decision makers to understand their team workflows at a detailed level and visualize what the exact status of each job is in each workflow at any time of the day. Moreover, there is a need to have an advanced system to monitor task status by tracking Key Performance Indicators (KPIs) with Service Level Agreements (SLA) for workflows in an entire management ecosystem, identify potential problems facing the store, and develop quick solutions to grow the retailer's business.

SUMMARY

An example computer-implemented method of visualizing live workflows disclosed herein can include: aggregating, by a processor from a database, Key Performance Indicator (KPI) datasets associated with a plurality of teams, each team comprising a plurality of jobs and each job comprising a KPI dataset; obtaining a predefined Service Level Agreement (SLA) value associated with each team for measuring each team workflow; and displaying, on a dashboard, the predefined SLA value and the KPI datasets associated with the plurality of the teams, wherein each team workflow is visualized as a sequence of bars along a column representing a time axis in real time.

An example system configured according to the concepts and principles disclosed herein can include: at least one processor; a computer program product containing executable instructions; and a computer-readable non-transitory storage medium having the executable instructions stored which, when executed by the processor, cause the processor to perform operations comprising: aggregating, by a processor from a database, Key Performance Indicator (KPI) datasets associated with a plurality of teams, each team comprising a plurality of jobs and each job comprising a KPI dataset; obtaining a predefined Service Level Agreement (SLA) value associated with each team for measuring each team workflow; and displaying, on a dashboard, the predefined SLA value and the KPI datasets associated with the plurality of the teams, wherein each team workflow is visualized as a sequence of bars along a column representing a time axis in real time.

A non-transitory computer-readable storage medium having instructions stored which, when executed by a computing device, cause the computing device to perform operations including: aggregating, by a processor from a database, Key Performance Indicator (KPI) datasets associated with a plurality of teams, each team comprising a plurality of jobs and each job comprising a KPI dataset; obtaining a predefined service Level Agreement (SLA) value associated with each team for measuring each team workflow; and displaying, on a dashboard, the predefined SLA value and the KPI datasets associated with the plurality of the teams, wherein each team workflow is visualized as a sequence of bars along a column representing a time axis in real time.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Example embodiments of this disclosure are illustrated by way of an example and not limited in the figures of the accompanying drawings, in which like references indicate similar elements and in which.

Figure 1:
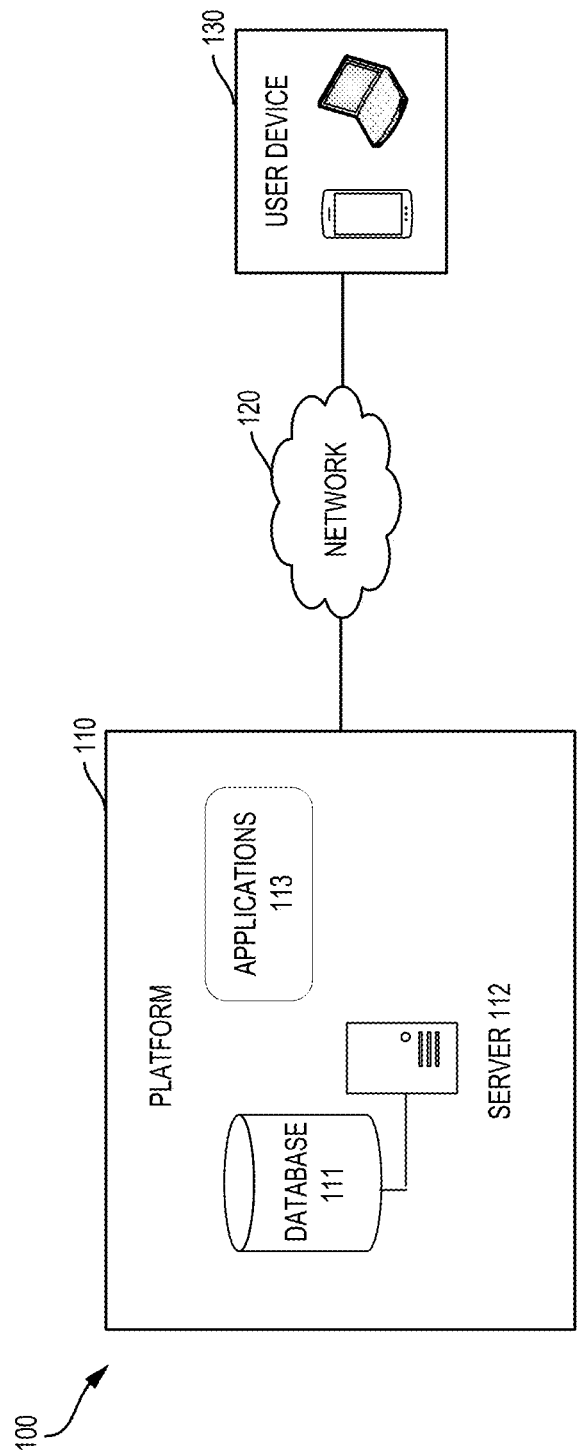
FIG. 1 is a block diagram illustrating an example computing environment in which some example embodiments may be implemented.

It is to be understood that both the foregoing general description and the following detailed description are example and explanatory and are intended to provide further explanations of the invention as claimed only and are, therefore, not intended to necessarily limit the scope of the disclosure.

DETAILED DESCRIPTION

Various example embodiments of the present disclosure will be described in detail below with reference to the accompanying drawings. Throughout the specification, like reference numerals denote like elements having the same or similar functions. While specific implementations and example embodiments are described, it should be understood that this is done for illustration purposes only. Other components and configurations may be used without parting from the spirit and scope of the disclosure, and can be implemented in combinations of the variations provided. These variations shall be described herein as the various embodiments are set forth.

The concepts disclosed herein are directed to systems and methods for visualizing live status workflows in an entire ecosystem on a single display screen. For example, in a retail sales workflow, there are many functions or operations performed by separate teams or departments within a store, such as inventory status, customer responses, price comparisons with local rivals, and sales trends. The data associated with these operations may be dynamically updated in real time. The system can bring an amount of information under one screen such that an impact of the changes and updates on the store operations can be assessed and assimilated into the analytics in real time. In some embodiments, the live status of the entire ecosystem can show job status and workflow details as graphical objects on a graphical user interface (GUI) or a user display screen up to a micro level.

The term "job" as used herein refers to the instructions for a team to perform. For example, in a retail sales environment, a "job" can refer to a set of sales processes applied, process parameters, resources used, other data required to determine how a sales service is performed, etc. A job status can be evaluated and manipulated by a job dataset that dynamically changes in real time. A "workflow" involves in a sequence of multiple jobs performed by a team or a department. Example team workflows identified in the retail management system may be "Instock", "Inventory", "Sales", etc. A team workflow is represented as a combination of performances of sequential jobs.

In various embodiments, Service Level Agreements (SLAs) are used to measure among different jobs performed by teams or internal departments in an entire ecosystem of a retailer. A service level agreement (SLA) may be a contract between a service requestor and a service provider that specifies required levels for a service. The SLAs may be commitments among internal teams or jobs within a retail store. Each SLA may be associated with datasets or metrics of the jobs assigned for a team. The goals of the SLAs aim to establish a cooperation and a mutual understanding of the teams for maximizing profit and increasing efficiency of the retailer's e-commerce operations. SLA goals are to reduce operational costs, gain new revenue and improve customer service.

The term "Key Performance Indicator (KPI)" as used herein refers to an indicator of a job or process assigned to a team. The KPI is a measurable parameter that represents how effectively a retail store is achieving key business objectives and demonstrates the effectiveness and performance of each job of the team under variable operational conditions.

The KPI is a tool that the retailer can use to regularly measure status of different workflows and jobs and visualize status and trends of the workflows associated with their SLAs. Once the goals of the SLAs for a workflow are defined, the KPIs can be utilized to measure progresses toward those goals and determine how effectively their SLA goals are achieved.

In various embodiments, the system uses a dashboard to monitor KPIs associated with the SLA goals in real time. The dashboard can show a complete visualization of the system health so that the related SLA achievement can be recognized and areas to improve can be identified promptly. For example, the dashboard can provide a domain level and an entire level workflow visualization. In case a failure occurs in the workflow, the dashboard can be used by engineers and decision makers to understand visually what exactly a root cause for the failure is. The visualized task status displayed on the dashboard may help each decision maker identify and define KPIs quickly so as to come up with real-time solutions.

The system can provide an automatic way for view, manage, analyze, optimize the jobs and workflows in real-time on-site or remotely via the Internet. The users may be developers and decision makers who can monitor or control different workflows in a retail store.

The system is highly useful for teams in a retail management system. For example, the system can evaluate and adjust the jobs performed by different teams efficiently. The system may then reduce a whole cost of the operations and management of the retail store. The support teams can use it to see which jobs need to be optimized and where the issues really happen on a live screen, which may then save a lot of time and management cost.

The method is implemented with unique algorithms which are written and executed to provide workflow details at micro level and show the live health of the entire ecosystem system. The same logic can be scaled up for other teams under a Global Data and Analytics Platform (GDAP) of the retailer. The same inventive concept can also be used across a plurality of retails stores in an entire management ecosystem.

FIG. 1 is a block diagram illustrating an example computing environment 100 in which some example embodiments may be implemented. The example computing environment 100 generally includes a platform 110, network 120, and user device 130.

The platform 110 may be a network-accessible computing platform to control the plurality of tasks and manage the task workflow. The platform 110 may be implemented as a cloud-based platform with a computing infrastructure. The platform 110 may include one or more servers and databases including processors, memory, applications 113, application program interface (API), and other components that are accessible via various type of wireless or wired networks. One or more servers, shown and referred to as a server 112 herein for simplicity, and one or more databases, shown and referred to as a database 111 herein for simplicity. These servers may include one or more processors and memory which may be utilized to process the data associated with workflows.

The server 112 may be a web server to implement web applications. The server 112 communicates with the database 111 to execute one or more sets of processes. The memory in the server 112 may store various algorithm generating modules or executed instructions/applications to be executed by the processor.

The database 111 may be communicatively coupled to the server 112 to receive instructions or data from and send data to the server 112 via network 120. The database 111 may store Service Level Agreements (SLAs) values and Key Performance Indicator (KPI) datasets associated with a plurality of teams.

The user device 130 may be a standalone server or a computing device, a mobile computing device or a display device located that in communication with the platform 110 via a network 120 such as a wired or wireless network.

Each job may be associated with a predefined service level agreement (SLA) including different service values and service requirements. Each job may be automatically associated with and assigned to a particular team or department. Different jobs may be dependent and cooperated with to each other. A given job may be dependent upon another job being completed.

Figure 2:
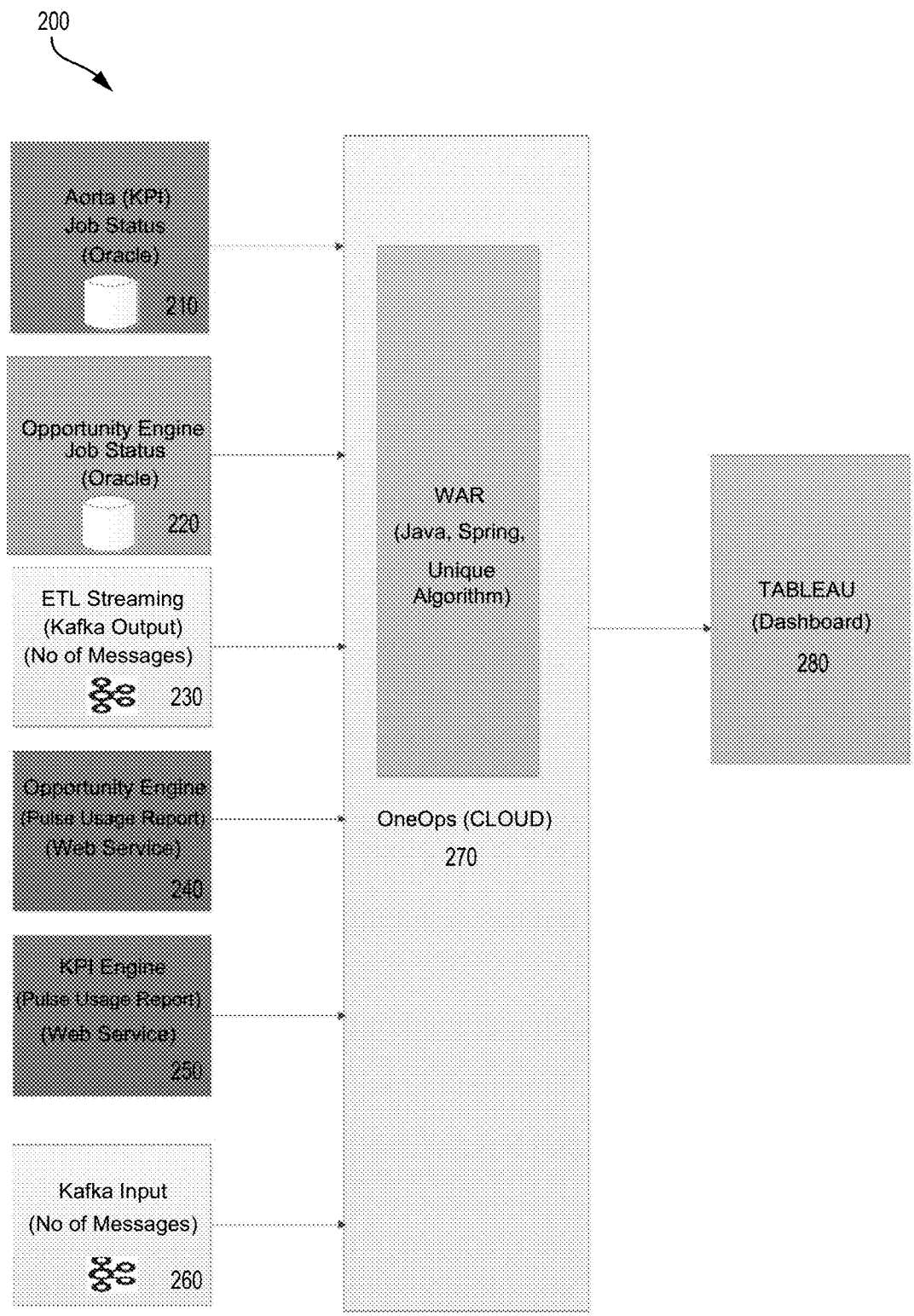
FIG. 2 is a block diagram illustrating a system architecture in which some example embodiments may be implemented.

FIG. 2 is a block diagram illustrating a cloud-based system architecture 200 in which some example embodiments may be implemented. The cloud-based system architecture 200 can be illustrated as a telemetry architecture to be used in an automatic measurement and transmission of data from a distant source to the databases in the cloud platform. The telemetry architecture can execute data acquisition and transformation activities across multiple role instances, and store data into multiple databases. To facilitate data reporting and analytics, job status data can be aggregated in a centralized database that serves as a main data source for both pre-defined data and custom reports in the dashboard.

The cloud-based system architecture 200 may include a cloud-based platform 270 to communicate with databases and servers for storing, retrieving and analyzing data. In some embodiments, the cloud-based system architecture 200 uses a cloud-based platform, such as an OneOps platform. The platform 270 can enable developers to design software products in a multi-cloud environment.

As illustrated in FIG. 2, the cloud-based system architecture 200 may use a database management system (e.g., Oracle database) to gather, store, and analyze the job dataset. The cloud-based system architecture 200 may include a database 210 associated with KPI job status and a database 220 associated with opportunity engine job status. The cloud-based system architecture 200 may include various software modules or executive applications stored in the memory and executed by the processors of the platform 270. For example, the cloud-based system architecture 200 include an opportunity engine 240 and a KPI engine 250 configured to provide web services. Moreover, the cloud-based system architecture 200 includes a distributed streaming platform (e.g., Kafka).

The distributed streaming platform includes a Kafka input engine 260 and an Extract Transform Load (ETL) streaming to implement a Kafka output engine 230. The distributed streaming platform may read, write, and store streams of data and enable real-time processing of the streams. For example, a stream processor in Kafka can take continual streams of data from input topics, perform some processing on this input, and produce continual streams of data to output topics. The stream processor may take in input streams of sales and an inventory data, and output or export a stream of reorders and price adjustments based on the sales record and the inventory data. The stream processor may effectively store and process historical data from the past, and further transform the data into a format required for analysis.

A plurality of jobs designated for a team may be associated with Key Performance Indicator (KPI) datasets which contain information related to job and the solution to a particular problem. Variety modules and engines (e.g., algorithms) are designed to analyze the job status and visually display the workflow in the dashboard 190 in real time.

The dashboard 190 is a data visualization tool or software that allow the users to understand the analytics of KPI datasets associated with a workflow of sequential jobs. The data associated with the KPIs can be retrieved from the database or data storages and be visualized on the dashboard 190 as graphical objects (e.g., bar charts) so that the users can track the health of their business against proposed SLA goals. For example, the system can use a central dashboard software (e.g., Tableau) to create bar charts with stored data from databases. As such, the users can easily and immediately monitor the overall SLA workflow, understand the KPIs, and improve the business operations through visual representations of the KPIs. The dashboard 190 may perform an analysis of data collected in a particular day and time. The dashboard 190 can automatically generate reports with the analyzed data as requested by the users, at anytime and anywhere via the network 120.

In some embodiments, the dashboard 190 can show live status of the KPIs and SLAs workflow in the entire ecosystem. Live status of the jobs and workflows in the entire ecosystem can be projected and displayed on the dashboard.

In some embodiments, the various screenshots may illustrate the following inventive features of visualizing KPIs and overall SLA workflow on the dashboard.

1) Each job is uniquely represented against a dynamic time axis in the screenshots.
2) A length of the bar of each job indicates how much time the job takes and can be compared with the workflow in previous days at a glimpse.
3) The SLA concept shows the system is within SLA or not.
4) Dependency principle indicates the reasons behind the missing SLAs.
5) The dashboard shows the behavior of different jobs at a detailed level.
6) Dynamic images can show the status of jobs at exact live moments. The dynamic images may be classified as failed image marks, passed image marks, running image marks, and pending image marks.
7) The dashboard is highly useful for production support teams.

In some embodiments, the live status of the system may include the following key features shown on the dashboard.

1) Different colors represent different jobs performed by a team and the length of individual bars represents the time taken by the jobs.
2) The team can easily visualize when the jobs start and end every day.
3) The team can easily visualize which job is consuming a maximum time in overall workflow every day so that decision makers can optimize concerned team in the future.
4) The SLA is met by an overall workflow.

5) Dependency principles can indicate the reasons why a team misses the SLA.
6) The status of jobs is indicated as dynamic images in real time.

Figure 3:
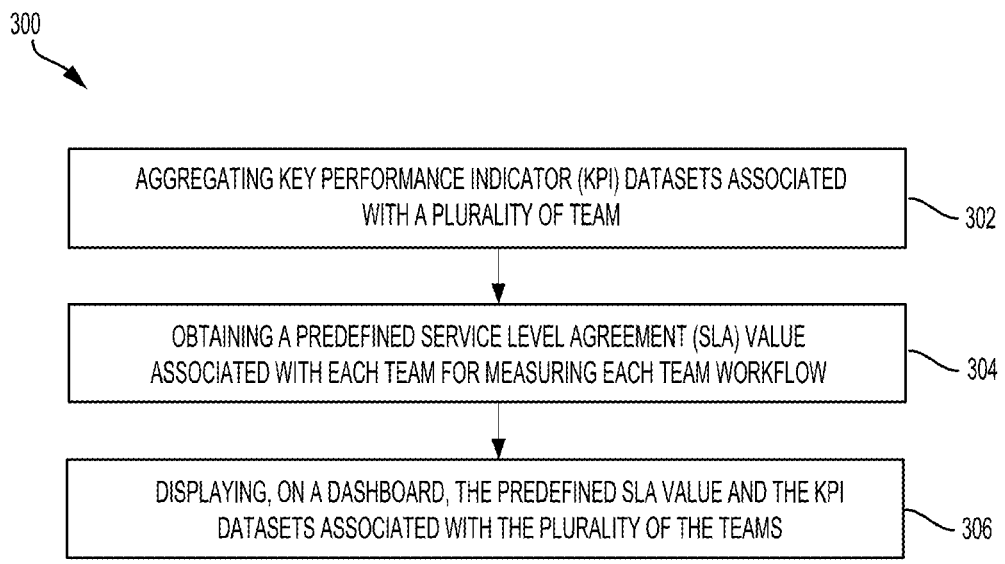
FIG. 3 is an example screenshot of visualizing a directed diagnostics KPIs with a SLA for a workflow on a dashboard in accordance with some embodiments.

FIG. 3 is a flowchart diagram illustrating an example process of visualizing live workflows in accordance with some embodiments. The process 300 may be implemented in the above described systems and may include the following steps. Steps may be omitted or combined depending on the operations being performed.

In step 302, Key Performance Indicator (KPI) datasets associated with a plurality of teams can be aggregated from a database by a processor. Each team may include a plurality of jobs. Each job is represented as a KPI dataset and displayed on the dashboard.

In step 304, a predefined service Level Agreement (SLA) value associated with each team can be obtained for measuring each team workflow. The SLA value for each workflow is predefined for the team.

In step 306, the predefined SLA value and the KPI datasets associated with the plurality of the teams can be displayed on a dashboard. Each team workflow is visualized as a sequence of bars (e.g., team workflow bar) along a column representing a time axis in real time.

Figure 4:
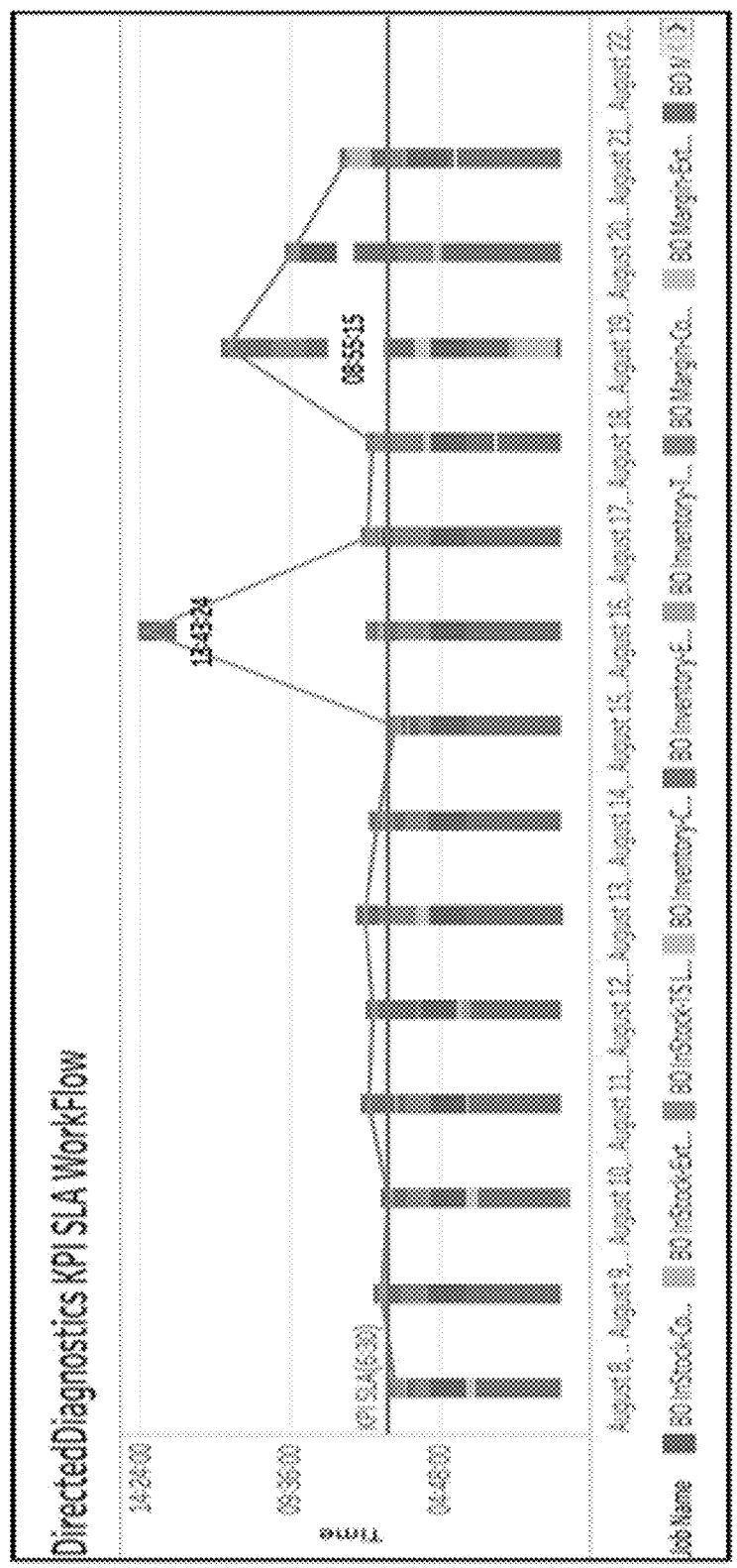
FIG. 4 is an example screenshot of a consolidated view of a workflow on a dashboard in accordance with some embodiments.

FIG. 4 shows a consolidated view of a workflow in the system within a continuous 15 days. The KPI dataset associated with each job may include a team name, a job identification, a job stating time, a job ending time, a job duration, a job status, a date, etc. The KPI dataset defines a set of values used to measure the job and team workflow against the predefined SLA value. These datasets of values are called indicators and are fed to the system in charge of summarizing the job and workflow information.

As shown in FIG. 4, multiple jobs are shown on the bottom the screenshot and indicated as different colors. The bar length associated to a job includes an amount sequence of periods during each of which a specific job is performed at a particular time in a day. The length of each period (e.g., job duration) dynamically changes along time axis every day. A length of an individual bar can represent the time taken by each job along a time axis. A team workflow is defined as a combination of sequential jobs. The team workflow can be visualized as a sequence of bars along a column representing a time axis in a particular day. The team can exactly identify when a job starts and ends in a day. The individual bars may not overlapped with each other. A red line crossing the full dashboard on the screenshot represents the SLA value predefined for the team. For example, the SLA value is predefined for the team to be 6:30 am.

Additionally, each workflow is shown in FIG. 4 by an individual column in a row axis of continuous 15 days. Displaying a team workflow at different days along a row axis may help to evaluate the team workflow trend and job efficiency. For example, if the displayed workflow surpasses or is over the SLA value, the system may consider the team workflow is lower than expected. The user may check the reason that causes the delay and then optimize the corresponding job assignment. The screenshot in FIG. 4 can show a consolidated view of the system with a trend for the continuous 15 days.

In some embodiments, the system provides a mouse-over function for a user to access the KPI dataset of each job and check the job status. For example, when a pointer of a computer mouse goes over a job bar, the related KPI dataset for the job is automatically displayed in a "pop-up" window to show the related job information.

Figure 5:
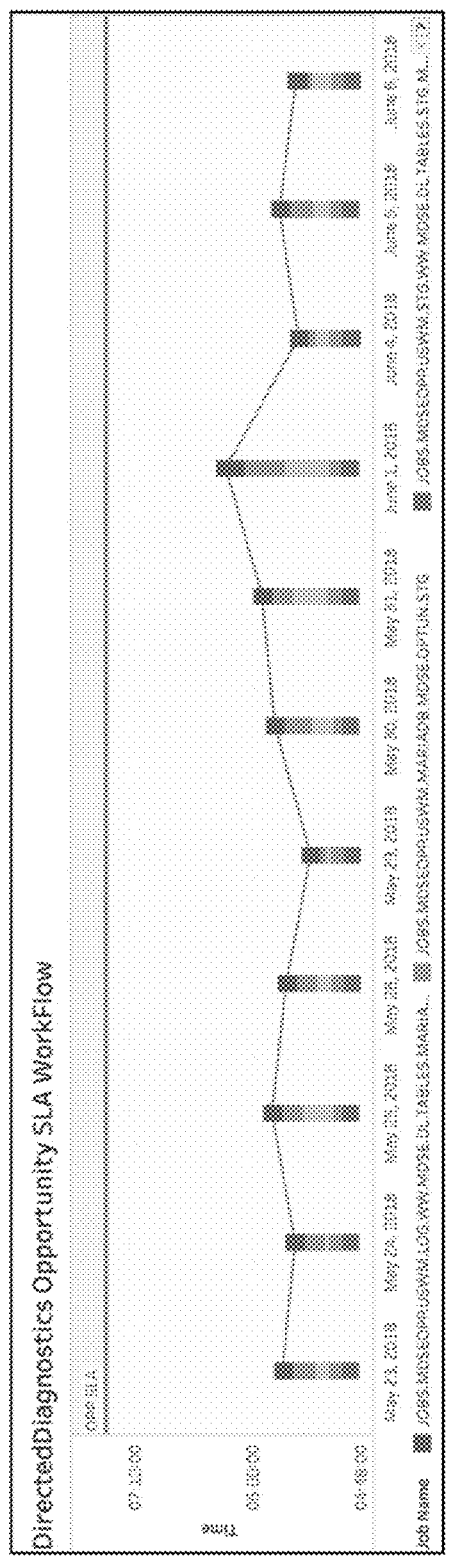
FIG. 5 is an example screenshot of visualizing a directed diagnostics opportunity SLA workflow on the dashboard in accordance with some embodiments.

FIG. 5 is an example screenshot of visualizing a directed diagnostics opportunity SLA workflow on the dashboard with the SLA met on each day in accordance with some embodiments.

Figure 6:
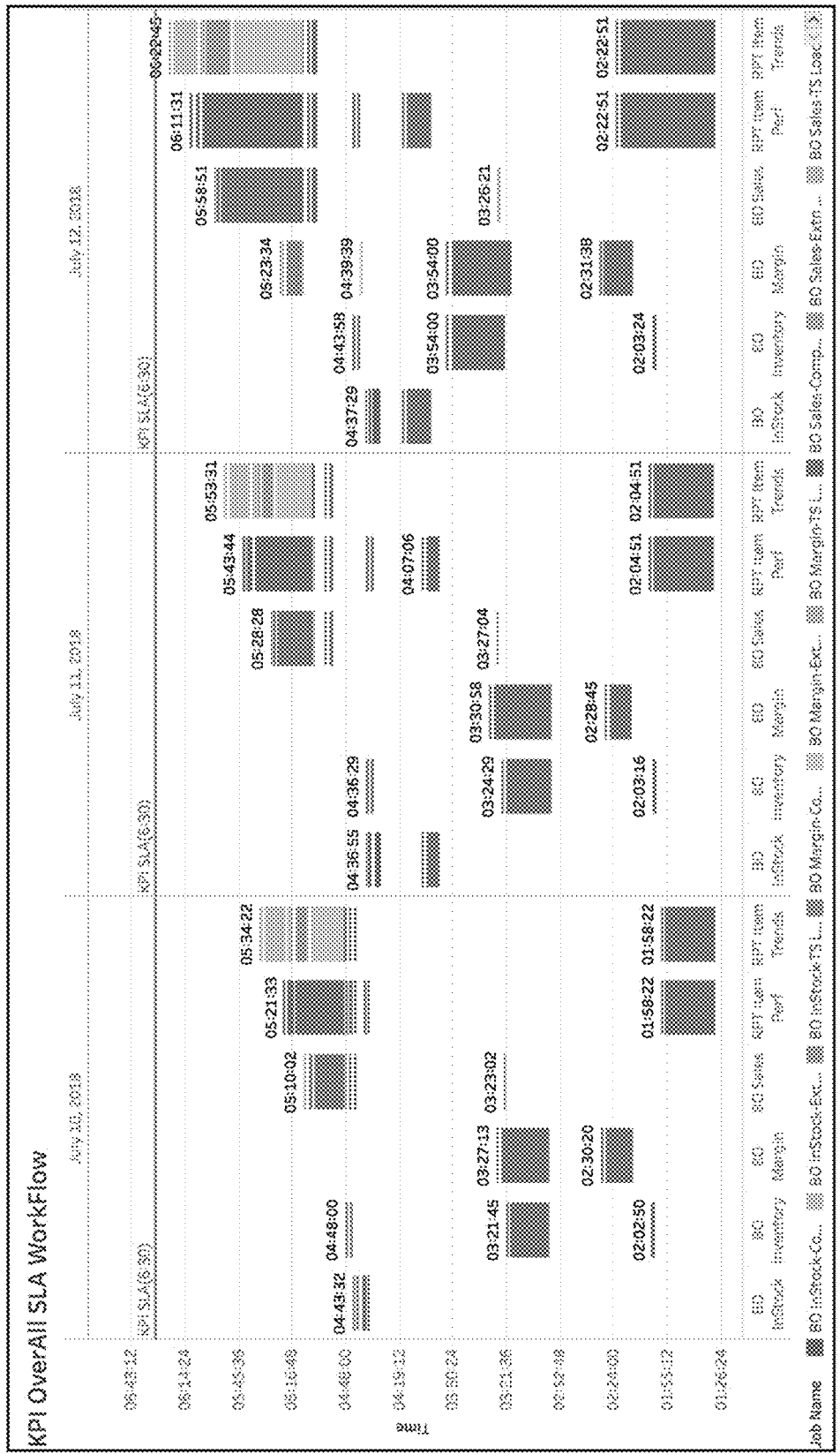
FIG. 6 is an example screenshot of visualizing KPIs and an overall SLA workflow on the dashboard in accordance with some embodiments.

FIG. 6 is an example screenshot of visualizing KPIs and an overall SLA workflow on the dashboard in accordance with some embodiments. The multiple jobs are shown on the bottom in the screenshot in FIG. 6 and indicated as different colors. Different team workflows are displayed along each column during a period of a continuous 3 day. The job completing time is shown on the top of each column of the team workflow bar. FIG. 6 shows all jobs in each team are completed under the SLA value. Thus, the SLA value is met by the overall team workflows.

Figure 7:
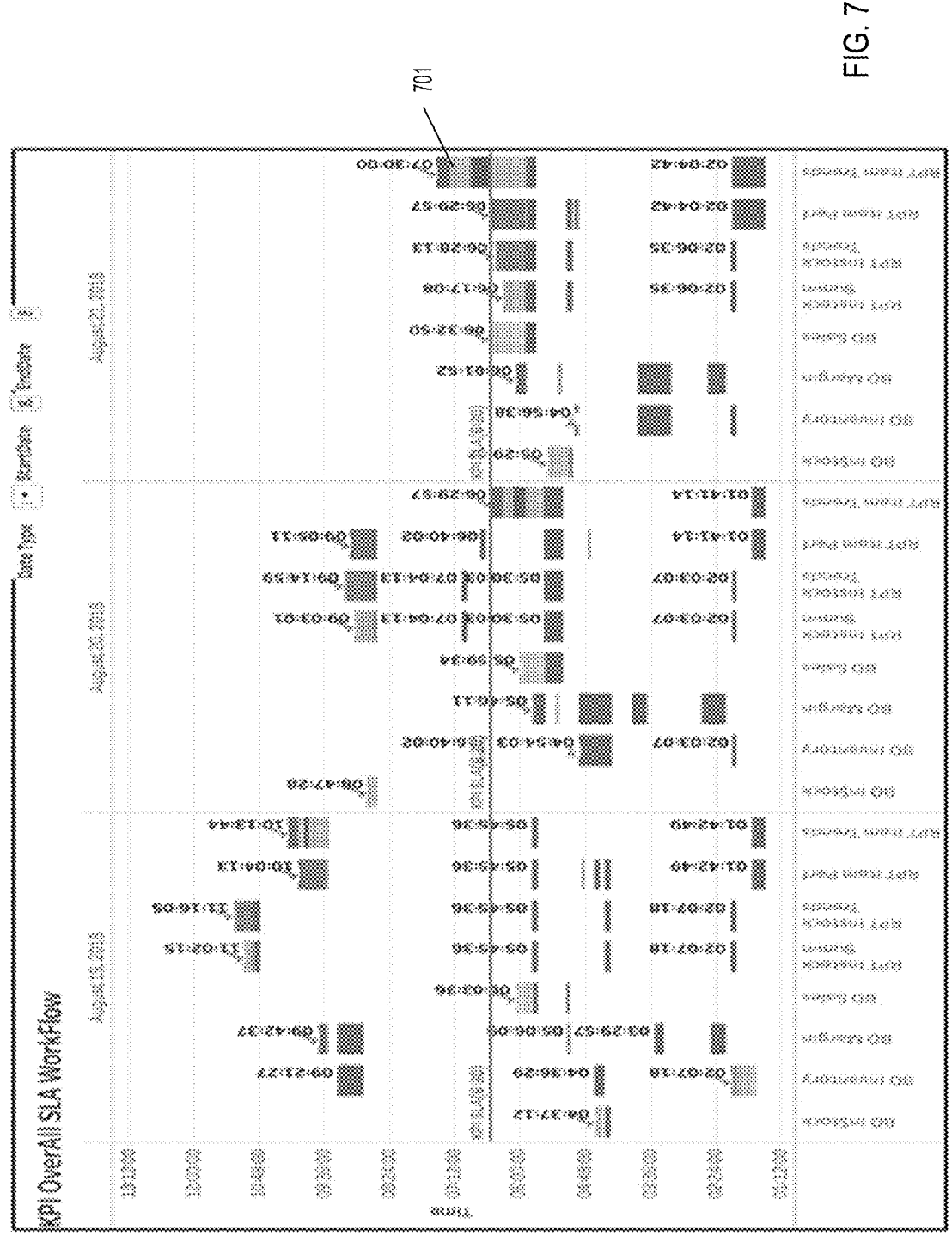
FIG. 7 is an example screenshot of visualizing KPIs on a dashboard with respect to subdomain names in accordance with some embodiments.

FIG. 7 is another example screenshot of visualizing KPIs and an overall SLA workflow displayed on the dashboard during a period of a continuous 3 day.

In the screenshot shown in FIG. 7, multiple team workflows are shown at the bottom and each team workflow is shown by a different column. A team can exactly identify when a job starts and ends every day during a period of a continuous 3 day. Each job status can be visualized as a unique predefined mark associated with the team. For example, in the workflow 701 shown in the extreme right column of "Aug. 21, 2018", jobs in blue, brown and green each can represent when the job start and when they ends. Each job or workflow status may be identified to be one of "Completed", "Failure", "Pending", and "Running". The status of the workflow 701 is "Completed". The corresponding team workflow status is visualized as a check mark on a top of the sequence of bars associated with the team.

In some embodiments, the system may include a plurality of teams, such as Instock, Inventory, Margin, Sales, Item Trends, etc. Those workflows provide visibility of business inventory performance and allow objective quantitative and qualitative evaluation aligned with the SLA goals.

Figure 8:
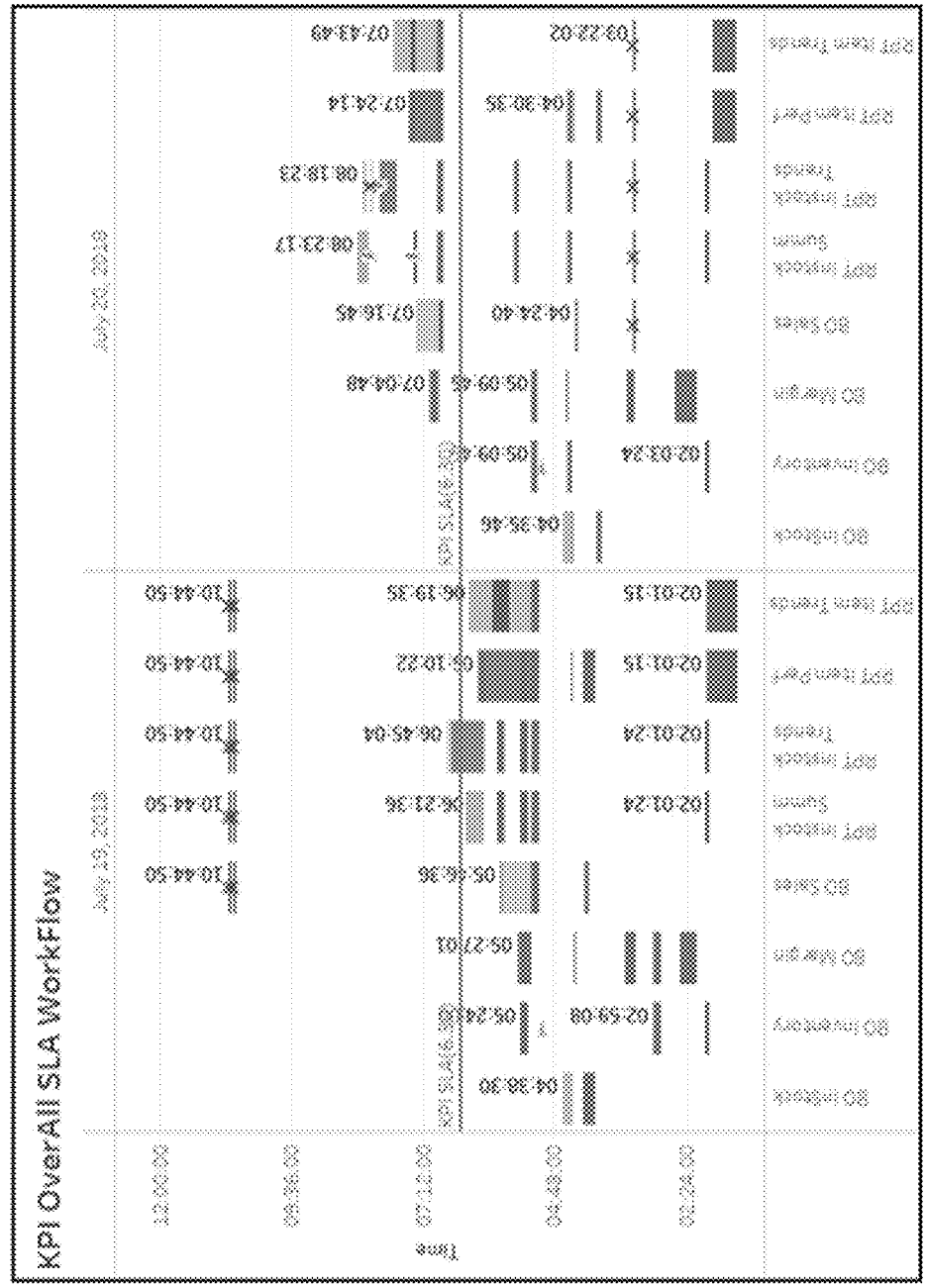
FIG. 8 is another example screenshot of visualizing KPIs and an overall SLA workflow respect to sub-domain names in accordance with some embodiments.

FIG. 8 is another example screenshot of visualizing KPIs and an overall SLA workflow displayed on a dashboard in accordance with some embodiments.

As shown in FIG. 8, the multiple workflows miss the SLA value of 6:30 am on the two continuous days. In some embodiments, dependency principles can indicate the reasons why a team misses the SLA. A given job may be dependent upon another job being completed. The decision makers may need to find the reason why the teams do not meet the SLA and figure out whether a team is dependent on some other teams. A team may comprise at least one dependent job associated with at least one dependent team. Further, verifying a workflow failure of the team may be based on a KPI dataset of the dependent job in another team. For example, if a team workflow is dependent on another team to provide required data to complete a job, the decision makers may need to analyze the related information and find out whether the failed team receives the required data from the dependent team on time.

The screenshot in FIG. 8 can show whether the predefined SLA is met by the overall SLA value or not. A red line crossing the full dashboard represents the SLA for the team, SLA is predefined by the team to evaluate the team workflow. As shown in FIG. 8, the predefined SLA for KPI team is at 6:30 am. The teams miss the SLA on July 19 and July 20th. All dependent jobs are shown in red color. The workflows shows that the SLA value is not met because dependent jobs are shown as red color and appear very late, which causes other jobs to delay. As such, the dependent jobs shown as red color with cross marks are indicated as the failure to show reasons why some team workflows do not meet the SLA.

Figure 9:
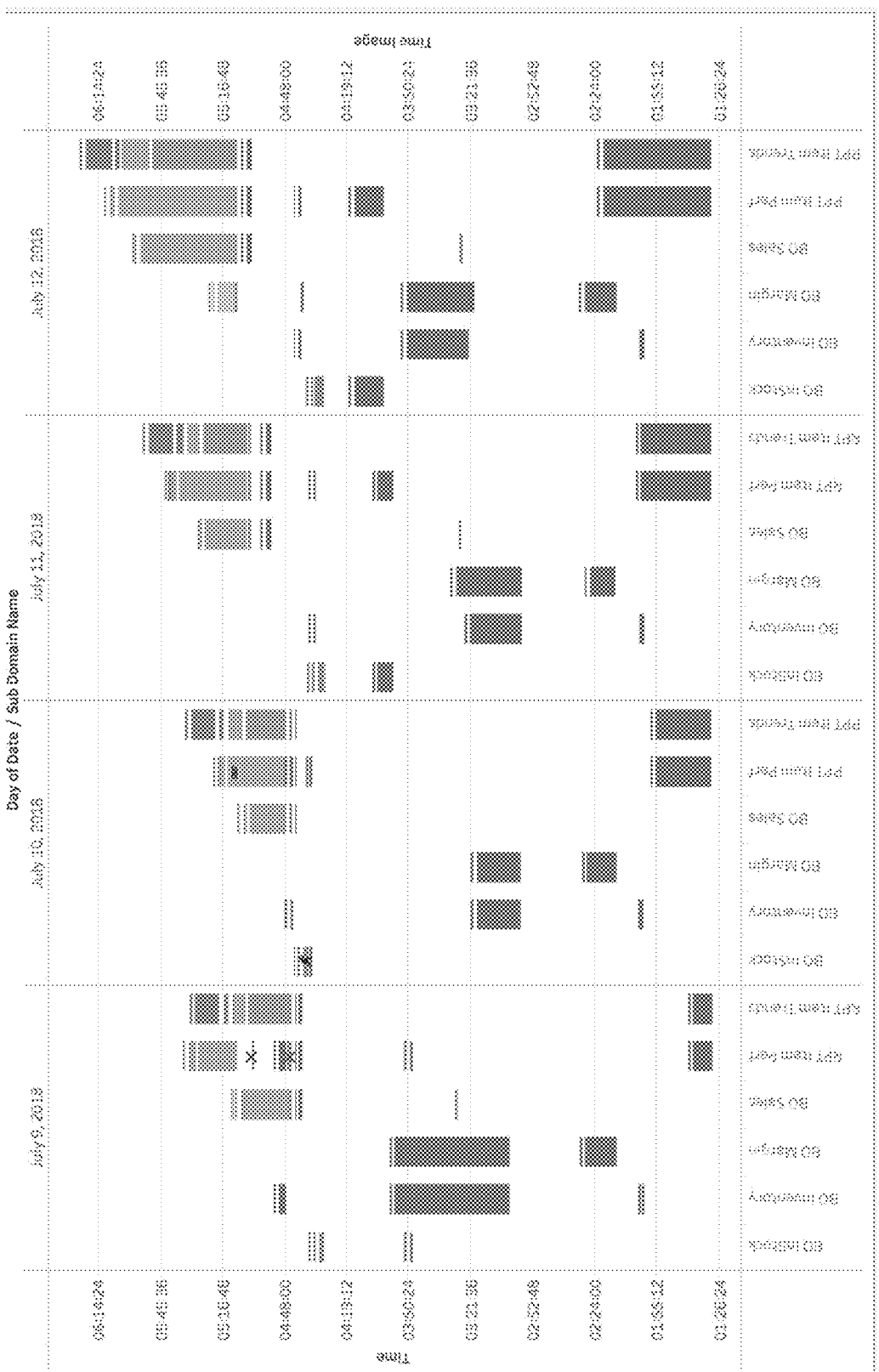
FIG. 9 is another example screenshot of visualizing KPIs and an overall SLA workflow in accordance with some embodiments.

FIG. 9 is another example screenshot of visualizing KPIs of team workflows within a sub-domain in accordance with some embodiments. Multiple team workflows are shown at the bottom and each team workflow is shown by a different column. Multiple workflows in a sub-domain area are displayed on the dashboard.

Live Status of the System

Figure 10:
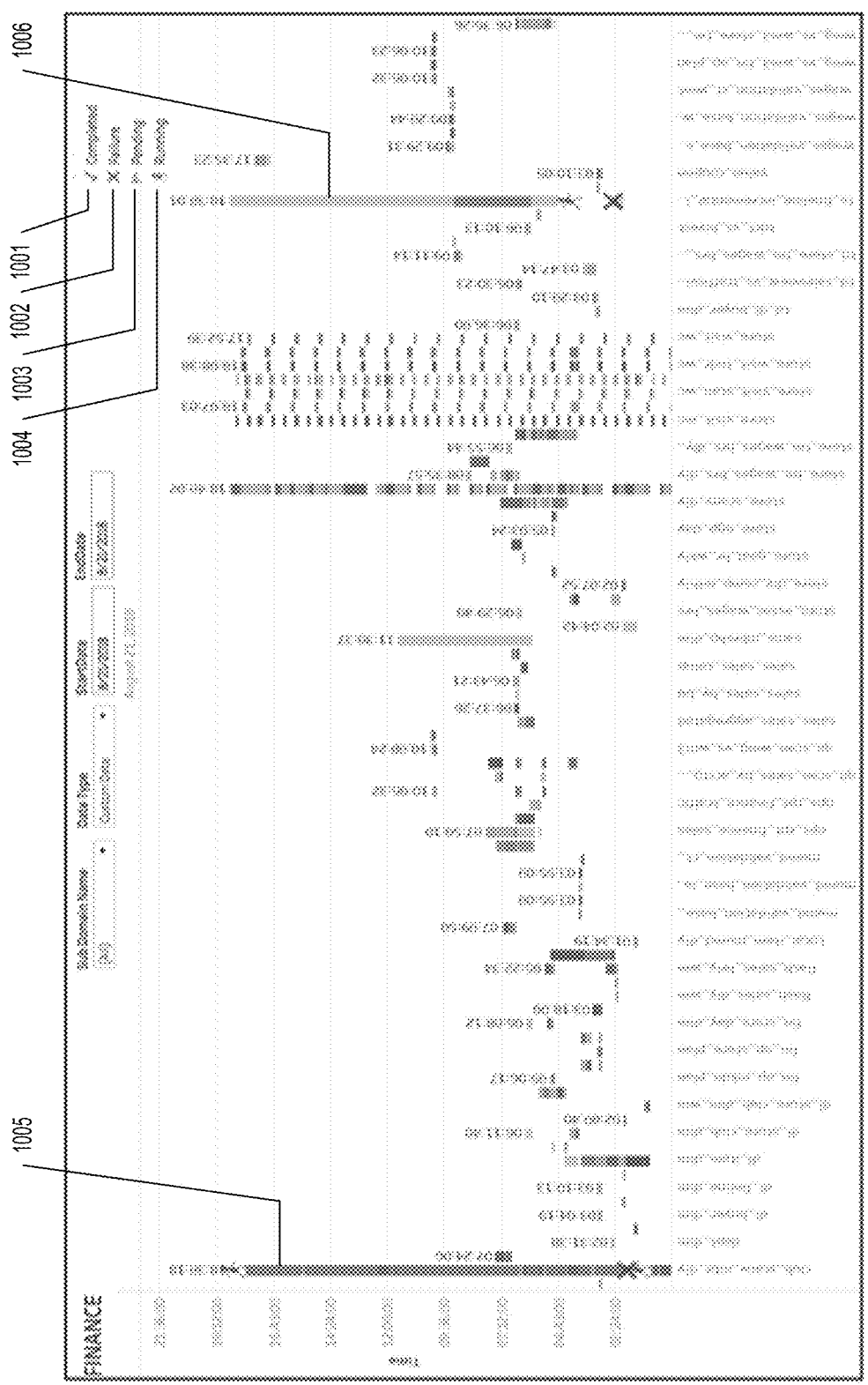
FIG. 10 is an example screenshot of visualizing KPIs and an overall SLA in accordance with some embodiments.

FIG. 10 is an example screenshot of visualizing workflows for all teams in an entire management ecosystem in accordance with some embodiments. All KPI datasets processing and analytical results can be sent to a single dashboard with a real-time visualization tool. The users may use the dashboard to quickly create new analytical results and understand deeper into numbers that explain exactly what is going on in the team workflow associated with the jobs.

In some embodiments, the dashboard is used to track a wide range of KPIs in an easy-to-understand visual format. For example, the screenshot in FIG. 10 can help the users to identify the failed jobs in the entire management ecosystem immediately.

As shown in FIG. 10, each team workflow status or a job status may be identified to be one of status, such as "Completed" 1001, "Failure"1002, "Pending" 1003, and "Running" 1004. The "completed" status 1001 of a job or a team workflow is visualized as a check mark on a top of the sequence of bars associated with the team. The "Failure" status 1002 is denoted as a cross mark. The "Pending" status 1003 is denoted as a flag mark and means a job has not started yet. "Running" status 1004 is denoted as a mark or image of a running person and means a job performer is still in a learning stage for preparing for the job. The status mark can be updated as soon as the job is completed. For example, the screenshot in FIG. 10 can show 2 failed jobs with cross marks and 2 running jobs with person image marks on the first column on the left side and the last column on the right side.

In some embodiments, the team can easily visualize which job is consuming a maximum time in overall workflow every day so that decision makers can optimize concerned team in the future. Based on the KPI dataset, the system may consider some factors when evaluating and optimizing the tasks in the overall system by identifying the progress of a plurality of teams. For example, the screenshot in FIG. 10 shows a job 1005 in pink color in the first column on the left side and a job 1006 in yellow color on the right side. Both jobs take the maximum time in the system and need to be optimized in the future.

Various embodiments may be implemented to facilitate in optimizing store operations in a wide variety of areas.

1) Opportunity team of directed diagnostics can use the telemetry to optimize the jobs.
2) The information shown in the dashboard can help a team to meet SLA on a daily basis.
3) The user can use the dashboard to visualize the overall workflow trend.
4) Pricing team can use telemetry to check the performance of on-demand jobs.

The system may facilities decision makers to find any problematic issues and have the ability to make very fast decisions, and implement changes based on incoming, real-time data to so that a complete visualization of the system health can be achieved.

Figure 11:
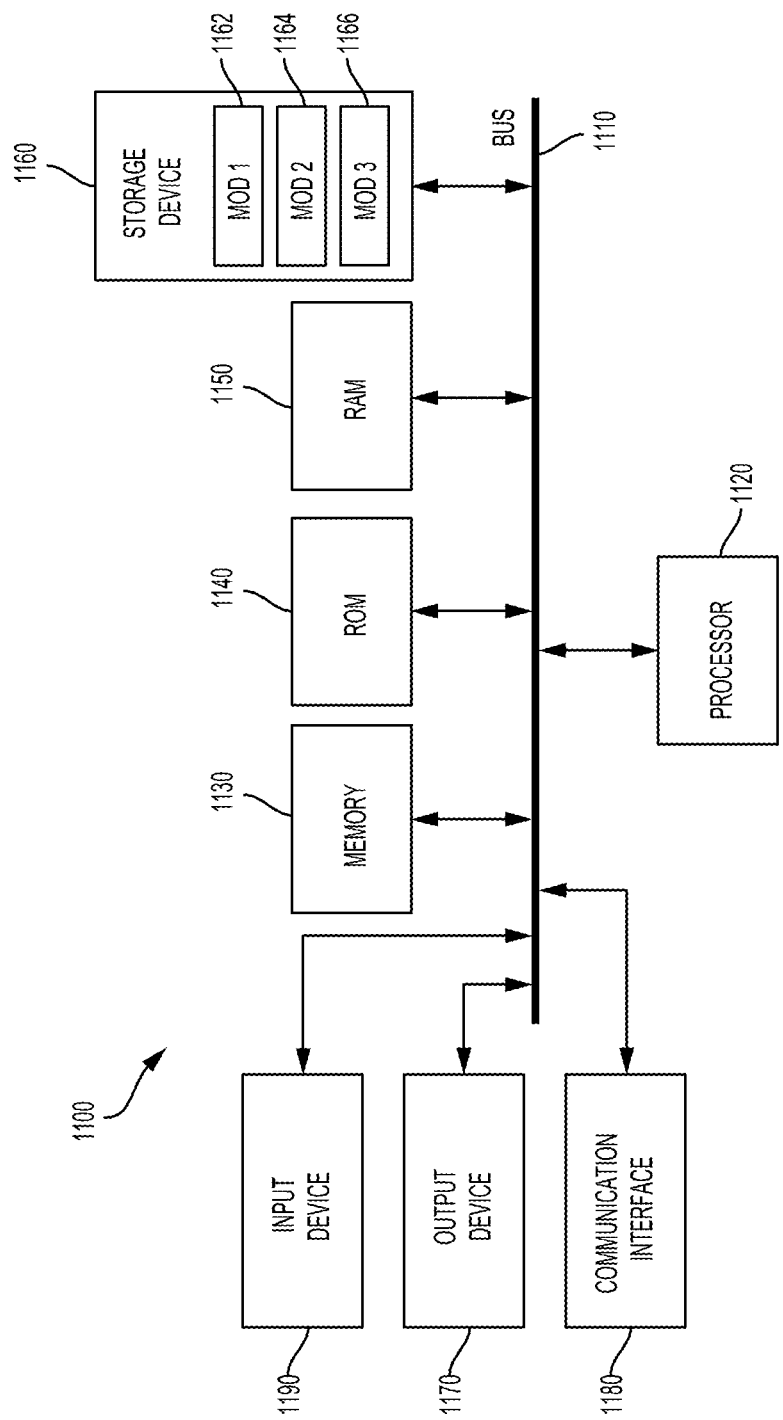
FIG. 11 is a block diagram illustrating an example computer system in which some example embodiments may be implemented.

FIG. 11 illustrates an example computer system 1100 which can be used to perform the systems for inventory monitoring as disclosed herein. The example system 1100 can include a processing unit (CPU or processor) 1120 and a system bus 1110 that couples various system components including the system memory 1130 such as read only memory (ROM) 1140 and random access memory (RAM) 1150 to the processor 1120. The system 1100 can include a cache of high speed memory connected directly with, in close proximity to, or integrated as part of the processor 1120. The system 1100 copies data from the memory 1130 and/or the storage device 1160 to the cache for quick access by the processor 1120. In this way, the cache provides a performance boost that avoids processor 1120 delays while waiting for data. These and other modules can control or be configured to control the processor 1120 to perform various actions. Other system memory 1130 may be available for use as well. The memory 1130 can include multiple different types of memory with different performance characteristics. It can be appreciated that the disclosure may operate on a computing device 1100 with more than one processor 1120 or on a group or cluster of computing devices networked together to provide greater processing capability. The processor 1120 can include any general purpose processor and a hardware module or software module, such as module 1 1162, module 2 1164, and module 3 1166 stored in storage device 1160, configured to control the processor 1120 as well as a special-purpose processor where software instructions are incorporated into the actual processor design. The processor 1120 may essentially be a completely self-contained computing system, containing multiple cores or processors, a bus, memory controller, cache, etc. A multi-core processor may be symmetric or asymmetric.

The system bus 1110 may be any of several types of bus structures including a memory bus or memory controller, a peripheral bus, and a local bus using any of a variety of bus architectures. A basic input/output (BIOS) stored in ROM 1140 or the like, may provide the basic routine that helps to transfer information between elements within the computing device 1100, such as during start-up. The computing device 1100 further includes storage devices 1160 such as a hard disk drive, a magnetic disk drive, an optical disk drive, tape drive or the like. The storage device 1160 can include software modules 1162, 1164, 1166 for controlling the processor 1120. Other hardware or software modules are contemplated. The storage device 1160 is connected to the system bus 1110 by a drive interface. The drives and the associated computer-readable storage media provide non-volatile storage of computer-readable instructions, data structures, program modules and other data for the computing device 1100. In one aspect, a hardware module that performs a particular function includes the software component stored in a tangible computer-readable storage medium in connection with the necessary hardware components, such as the processor 1120, bus 1110, display 1170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 1100 is a small, handheld computing device, a desktop computer, or a computer server.

Although the example embodiment described herein employs the hard disk 660, other types of computer-readable media which can store data that are accessible by a computer, such as magnetic cassettes, flash memory cards, digital versatile disks, cartridges, random access memories (RAMs) 1150, and read only memory (ROM) 1140, may also be used in the example operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 1100, an input device 1190 represents any number of input mechanisms, such as a microphone for speech, a touch-sensitive screen for gesture or graphical input, keyboard, mouse, motion input, speech and so forth. An output device 1170 can also be one or more of a number of output mechanisms known to those of skill in the art. In some instances, multimodal systems enable a user to provide multiple types of input to communicate with the computing device 1100. The communications interface 1180 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

What is claimed is:

1. A computer-implemented method of visualizing live workflows, comprising:
    aggregating, by a processor from a database, Key Performance Indicator (KPI) datasets associated with a plurality of teams, each team comprising a plurality of jobs and each job comprising a KPI dataset;
    obtaining a predefined service Level Agreement (SLA) value associated with each team for measuring each team workflow;
    displaying, on a dashboard, the predefined SLA value and the KPI datasets associated with the plurality of teams;
    displaying each team workflow as a sequence of bars along a column representing a time axis in real time, wherein each job is visualized as a bar on the dashboard along the column representing the time axis, the bar being displayed with a predefined color and a length of the job duration, and wherein a job starting time and a job ending time are indicated by a start and an end position of each team workflow bar along the time axis; and
    displaying each team workflow at a plurality of dates along a row axis for evaluating a team workflow trend, wherein the predefined SLA value is visualized as a line crossing the team workflows of the plurality of teams across the plurality of dates of the dashboard.

2. The method of claim 1, wherein the KPI dataset associated with each job comprises a team name, a job identification, a job stating time, a job ending time, a job duration, a job status, and date.

3. The method of claim 1, wherein each team workflow status is identified to be one of "Completed", "Failure", "Pending", and "Running".

4. The method of claim 1, wherein each team workflow status is visualized as a unique predefined mark on a top of the sequence of bars associated with the team.

5. The method of claim 1, wherein a team comprises at least one dependent job associated with at least one dependent team, and further comprising verifying a workflow failure of the team based on a KPI dataset of the dependent job.

6. The method of claim 1, further comprising:
    displaying workflows for all teams in an entire management ecosystem along columns;
    identifying failed jobs on the dashboard; and
    optimizing the jobs based on the KPI datasets associated with the jobs.

7. The method of claim 1, wherein the processor and the database are operated on a cloud-based service platform.

8. A system of visualizing live workflows, the system comprising: at least one processor;
    a computer program product containing executable instructions; and
    a computer-readable non-transitory storage medium having the executable instructions stored
    which, when executed by the processor, cause the processor to perform operations comprising:
    aggregating, by the processor from a database, Key Performance Indicator (KPI) datasets associated with a plurality of teams, each team comprising a plurality of jobs and each job comprising a KPI dataset;
    obtaining a predefined service Level Agreement (SLA) value associated with each team for measuring each team workflow;
    displaying, on a dashboard, the predefined SLA value and the KPI datasets associated with the plurality of teams,
    displaying each team workflow as a sequence of bars along a column representing a time axis in real time, wherein each job is visualized as a bar on the dashboard along the column representing the time axis, the bar being displayed with a predefined color and a length of the job duration, and wherein a job starting time and a job ending time are indicated by a start and an end position of each team workflow bar a long the time axis; and
    displaying each team workflow at a plurality of dates along a row axis for evaluating a team workflow trend, wherein the predefined SLA value is visualized as a line crossing the team workflows of the plurality of teams across the plurality of dates of the dashboard.

9. The system of claim 8, wherein the KPI dataset associated with each job comprises a team name, a job identification, a job stating time, a job ending time, a job duration, a job status, and date.

10. The system of claim 8, wherein each team workflow status is identified to be one of "Completed", "Failure", "Pending", and "Running".

11. The system of claim 8, wherein each team workflow status is visualized as a unique predefined mark on a top of the sequence of bars associated with the team.

12. The system of claim 8, wherein a team comprises at least one dependent job associated with at least one dependent team, and further comprising verifying a workflow failure of the team based on a KPI dataset of the dependent job.

13. The system of claim 8, further comprising:
    displaying workflows for all teams in an entire management ecosystem along columns;
    identifying failed jobs on the dashboard; and
    optimizing the jobs based on the KPI datasets associated with the jobs.

14. The system of claim 8, wherein the processor and the database are operated on a cloud-based service platform.

15. A non-transitory computer-readable storage medium having instructions stored which, when executed by a computing device, cause the computing device to perform operations comprising:
- aggregating, by a processor from a database, Key Performance Indicator (KPI) datasets associated with a plurality of teams, each team comprising a plurality of jobs and each job comprising a KPI dataset;
- obtaining a predefined service Level Agreement (SLA) value associated with each team for measuring each team workflow;
- displaying, on a dashboard, the predefined SLA value and the KPI datasets associated with the plurality of teams; and
- displaying each team workflow as a sequence of bars along a column representing a time axis in real time, wherein each job is visualized as a bar on the dashboard along the column representing the time axis, the bar being displayed with a predefined color and a length of the job duration, and wherein a job starting time and a job ending time are indicated by a start and an end position of each team workflow bar a long the time axis;
- displaying each team workflow at a plurality of dates along a row axis for evaluating a team workflow trend, wherein the predefined SLA value is visualized as a line crossing the team workflows of the plurality of teams across the plurality of dates of the dashboard.

16. The non-transitory computer-readable storage medium of claim 15, wherein each team workflow status is identified to be one of "Completed", "Failure", "Pending", and "Running", and each team workflow status is visualized as a unique predefined mark on a top of the sequence of bars associated with the team.

* * * * *